(12) United States Patent
Voll et al.

(10) Patent No.: US 6,478,092 B2
(45) Date of Patent: Nov. 12, 2002

(54) WELL COMPLETION METHOD AND APPARATUS

(75) Inventors: Benn A. Voll, Houston, TX (US); Elmer R. Peterson, Lafayette, LA (US); Simon Angelle, Arnaudville, LA (US); Ken Dyson, St. Martinville, LA (US); John L. Baugh, Houston, TX (US); John T. Broome, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 15 days.

(21) Appl. No.: 09/729,808

(22) Filed: Dec. 5, 2000

(65) Prior Publication Data

US 2002/0070031 A1 Jun. 13, 2002

Related U.S. Application Data (60) Provisional application No. 60/231,627, filed on Sep. 11, 2000.

(51) Int. Cl.$^7$ .............................................. E21B 43/08
(52) U.S. Cl. ........................................ 166/378; 166/227
(58) Field of Search ................................. 166/230, 227, 166/231, 233, 236, 378, 276, 278

(56) References Cited

U.S. PATENT DOCUMENTS

| | | | | |
|---|---|---|---|---|
| 767,234 A | * | 8/1904 | Patterson | 166/230 |
| 921,337 A | * | 5/1909 | Archer | 166/230 |
| 1,342,986 A | * | 6/1920 | Cater | 166/230 |
| 1,569,098 A | * | 1/1926 | Mark | 166/230 |
| 2,217,370 A | | 10/1940 | Johnston | |
| 2,858,894 A | | 11/1958 | Akeyson | |
| 2,877,852 A | * | 3/1959 | Bashara | 166/230 |
| 2,990,017 A | * | 6/1961 | Powers | 166/230 |
| 3,087,560 A | * | 4/1963 | Dodson | 166/230 |
| 3,099,318 A | | 7/1963 | Miller et al. | |
| 3,297,092 A | | 1/1967 | Jennings | |
| 3,680,183 A | | 8/1972 | Sundberg et al. | |
| 4,483,399 A | | 11/1984 | Colgate | |
| 5,293,935 A | | 3/1994 | Arterbury et al. | |
| 5,348,095 A | | 9/1994 | Worrall et al. | |
| 5,366,012 A | | 11/1994 | Lohbeck | |
| 5,611,399 A | | 3/1997 | Richard et al. | |
| 5,667,011 A | | 9/1997 | Gill et al | |
| 5,899,271 A | * | 5/1999 | Simone et al. | 166/230 |
| 5,901,789 A | | 5/1999 | Donnelly et al. | |
| 5,979,551 A | | 11/1999 | Uban et al. | |
| 5,980,745 A | | 11/1999 | Voll et al. | |
| 6,012,522 A | | 1/2000 | Donnelly et al. | |
| 6,354,373 B1 | | 3/2002 | Vercaemer et al. | |

FOREIGN PATENT DOCUMENTS

| | | |
|---|---|---|
| EP | 0952306 A1 | 10/1999 |
| FR | 2771133 | 5/1999 |
| GB | 232896 A | 1/1999 |
| GB | 2329916 A | 4/1999 |
| GB | 2336383 A | 10/1999 |
| GB | 2344606 A | 6/2000 |
| WO | WO 95/25239 | 9/1995 |
| WO | WO 98/00626 | 1/1998 |
| WO | WO 00/37766 | 6/2000 |
| WO | WO 00/50732 | 8/2000 |
| WO | WO 00/50733 | 8/2000 |
| WO | WO 01/33037 | 5/2001 |
| WO | WO 01/98623 | 12/2001 |

* cited by examiner

*Primary Examiner*—Frank Tsay
(74) *Attorney, Agent, or Firm*—Steve Rosenblatt (57) ABSTRACT

Three embodiments of an expandable screen are described. In the preferred embodiment, the base layer, filtering layer, and outer layer are joined together in a sintering furnace in the form of a flat sheet which is in turn rolled up. The layered sheet is then formed into a tube by rolling it to make a longitudinal or spiral joint which is welded with connections placed on ends. In an alternative embodiment, the base layer and filtering layer are sintered together and formed into a tube which is in turn inserted into an outer protective tube. In a third embodiment, a base pipe is perforated and its exterior surface threaded. A wire runs through the threads with a protective jacket over the underlying assembly. Upon expansion, the opening sizes remain relatively constant.

25 Claims, 6 Drawing Sheets

WELL COMPLETION METHOD AND APPARATUS

PRIORITY INFORMATION

This application claims the benefit of U.S. Provisional Application No. 60/231,627, filed on Sep. 11, 2000.

FIELD OF THE INVENTION

The field of this invention relates to down hole screens which can be expanded into contact with the formation.

BACKGROUND OF THE INVENTION

Down hole screens are used in a variety of different applications. As part of a common procedure called gravel packing, the screens are deposited adjacent the producing formation and the surrounding annular space is filled with sand known as gravel. Various fabrication techniques have been developed for manufacturing such screens and a typical example is illustrated in U.S. Pat. No. 5,611,399.

More recently it has been determined that it is desirable to reduce the size of the annular space between the screen and the formation. Reduction of the volume of the annular space around the screen discourages fluid flow along the screen which, in turn lessens the production of sand. In order to be able to produce the formation longer, it has been desirable to insert screens in well bores or laterals and thereafter expand them. A good example of the expansion techniques for a down hole screen in U.S. Pat. No. 6,012,522. In this patent, overlapping segments of screen are placed on a base pipe which is ultimately expanded from within when placed in position in the well bore or a lateral. The shortcoming of this technique is that portions of the filtering material must be moved relative to each other which subjects them to tearing which in turn can result in a failure of the expanded screen assembly to control the production of sand. Another shortcoming of such designs is the limited capacity to withstand collapse.

Other patents relating to pipe expansions are: U.S. Pat. Nos. 5,901,789 and 5,366,012.

The main objective of the present invention is to allow easy installation of the screen to the desired location followed by expansion to reduce the volume of the annular space around the screen. Yet another object of the invention is to expand the screen against the formation to entirely eliminate the annular space around it. Yet another objective of the present invention is to allow the use of the structure of the screen down hole even without expansion. Another objective of the present invention is to decrease the amount of stress on the filtration member when expanded. Yet another objective of the present invention is to provide a significantly stronger structure for the finished product which even after expansion presents a greater resistance to collapse.

SUMMARY OF THE INVENTION

Three embodiments of an expandable screen are described. In the preferred embodiment, the base layer, filtering layer, and outer layer are joined together in a sintering furnace in the form of a flat sheet which is in turn rolled up. The layered sheet is then formed into a tube by rolling it to make a longitudinal or spiral joint which is welded with connections placed on ends. In an alternative embodiment, the base layer and filtering layer are sintered together and formed into a tube which is in turn inserted into an outer protective tube. In a third embodiment, a base pipe is perforated and its exterior surface threaded. A wire runs through the threads with a protective jacket over the underlying assembly. Upon expansion, the opening sizes remain relatively constant.

DETAILED DESCRIPTION OF THE DRAWING

DETAILED DESCRIPTION OF THE PREFERRED EMBODIMENT

Figure 1:
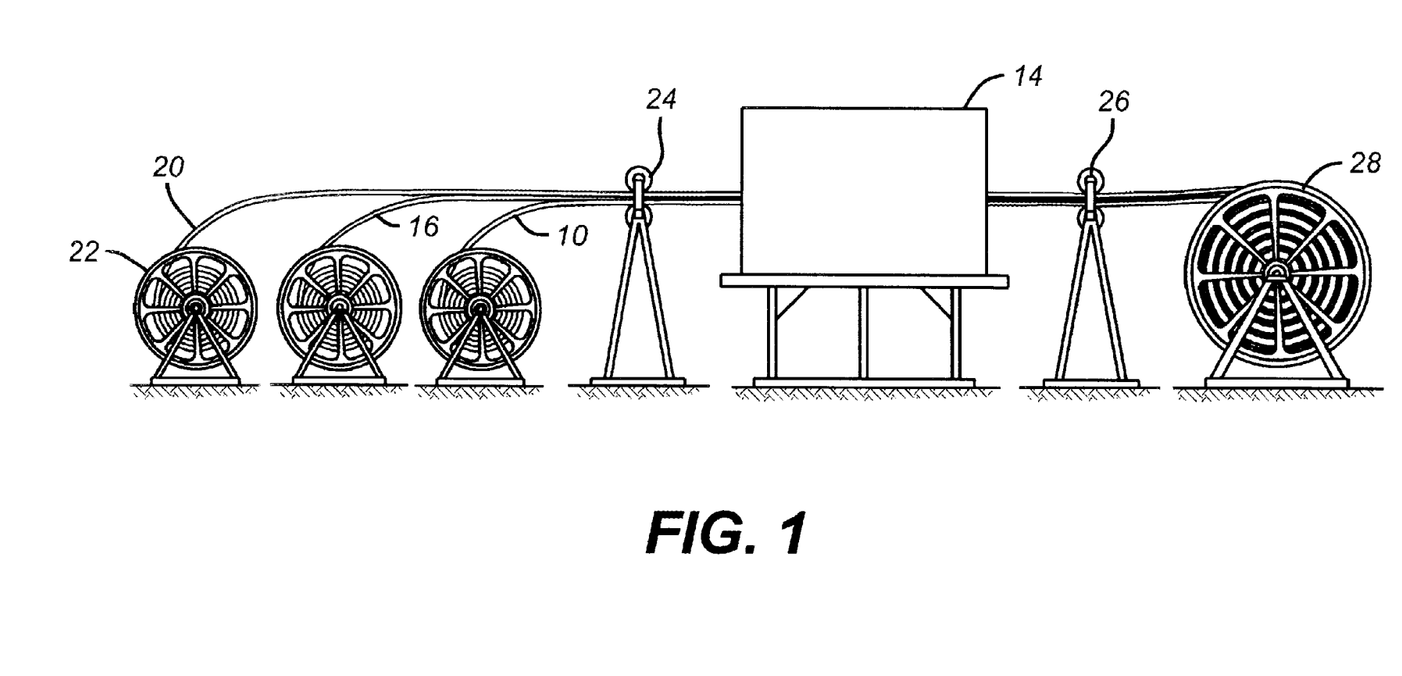
FIG. 1 is a schematic view showing the various layers being fed into a sintering furnace and rolled up on the other side.
Figure 2:
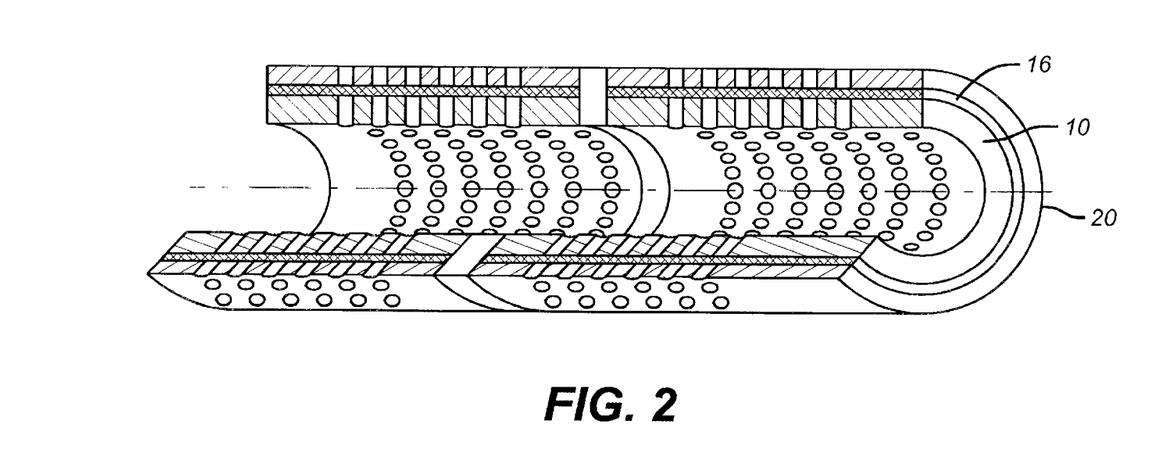
FIG. 2 is a section view through a tube formed by the process shown in FIG. 1.
Figure 4:
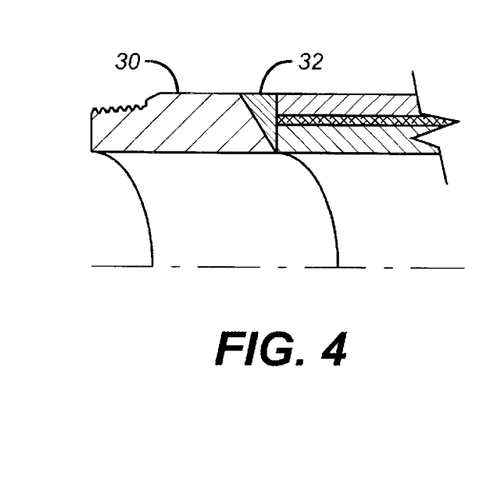
FIG. 4 is a section view showing an end connection on a formed tube from the process shown in FIG. 1 or from the end product from a modified version of the process whose end product is shown in FIG. 3.

Referring now to FIG. 1, an inner layer 10 is fed off a reel 12 in sheet form into a sintering furnace 14. A filter layer 16 is fed off reel 18 into the furnace 14 above inner layer 10. An outer layer 20 is fed off of reel 22 into the sintering furnace 14. The three layers 10, 16, and 20 come off in a sheet and get initially compressed together through rollers 24 before the furnace 14 and rollers 26 after the furnace 14. A take-up reel 28 collects the sintered together assembly of the layers 10, 16, and 20 onto itself. Other techniques of joining layers are also within the scope of the invention such as welding or fusing. Referring to FIG. 2, the material off of reel 28 is placed into a tubular form which can have alternatively either a longitudinal joint or can be spirally wound into a tubular shape and then spirally welded so that it presents a long tube, a cut-away of which is shown in FIG. 2. The inner layer 10 is preferably 0.09 inches thick with 0.125 inch diameter holes and having a 30 to 40% open area. In this preferred as well as the other embodiments the holes or openings can be round, somewhat out of round, triangular, oval, elliptical, square or polygonal to name some shapes. Openings should preferably not be slots. The openings need not be in a particular pattern and do not need overlap longitudinally. These openings can be formed in a number of ways such as perforating, drilling, milling or water jetting. The filtering layer 16 is preferably 0.031 inches thick and comprises a mesh weave. The outer layer is 20 is preferably 0.060 inches thick with 0.125 diameter holes with 30 to 40% open area. The assembly shown in FIG. 2 may be expanded diametrically 25%±10% minimizing the stress on the filter layer 16 because the layers 10, 16, and 20 are connected together and expand together. By virtue of having run the three layers 10, 16 and 20 through the sintering furnace and rollers 24 and 26, a stronger structure is presented which has greater collapse strength than pervious known designs. Relative movement of the layers does not occur as in the past as shown in the U.S. Pat. No. 6,012,522 because of the sintering process. FIG. 4 illustrates that an end connection 30 can be attached with a weld 32. The end connection 30 can be put at one or both ends of each tube so that one tube or a series of tubes can be connected together and made part of a completion assembly in a manner known in the art.

The suggested screen configurations can be formed (created) by taking the individual components that are on spools, placing the layers together and subjection the resulting sandwich to a sintering process. Exiting the continuous feed sintering oven the layered product could be formed into a tubular product and rolled up on a spool or remain a continuous flat sheet and collected on a spool. Once the layers are sintered and placed on a spool the continuous sintered layered filtration media could be shaped and cut into individual tubes, cut into panels to be welded together to form a tube or shaped into a continuous tube and run down hole at a later date. This forming could take place at the rig site.

A The individual layers that are placed together and sintered together can consist of several different materials and the number of layers may be as few as 2 or as many as 20. Material possibilities are, but not limited to: perforated metal, drilled metal, various wire weaves such as; square, twill, Dutch and twill Dutch.

In the suggested manufacturing technique the sintering process sued would be one that could handle continuous rolls of material to be layered and sintered, entering and exiting the oven.

Figure 7:
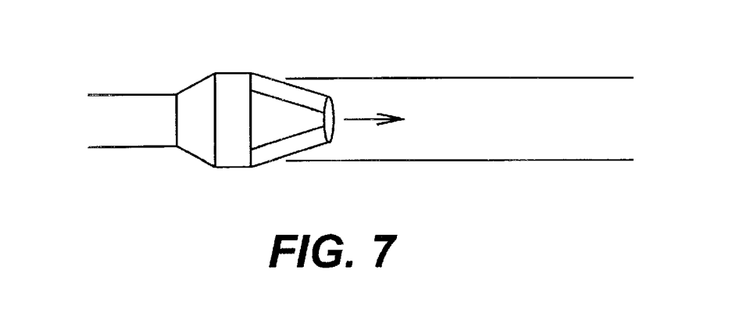
FIGS. 7 and 8 show expanding the assembly mechanically from above.
Figure 8:
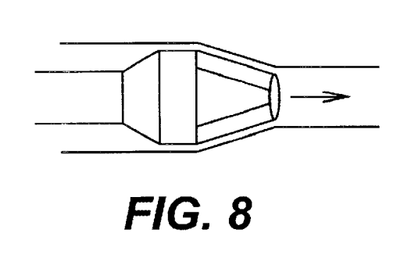
Figure 9:
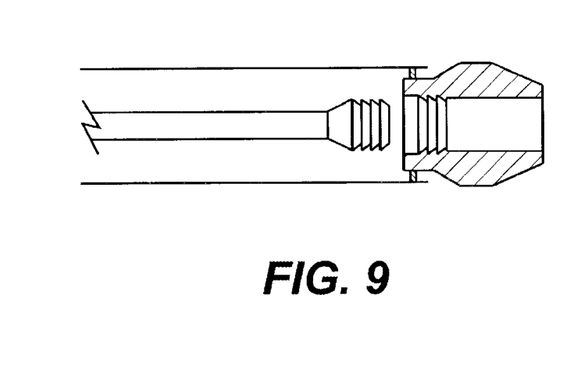
FIG. 9 shows expanding the assembly mechanically from below.

The mechanical properties of the screen would be such to allow for easy expansion. There are several methods that may be used to expand the described screen. One method is to mechanically expand the screen using a cone shaped apparatus that has a larger OD than the screen ID and push this apparatus through the screen. (FIGS. 7 and 8). A variation of this would be to place the cone expanding apparatus on the bottom of the screen. A length of tubing would be connected (latched) to the cone and pull the cone through the screen (See FIG. 9).

Figure 10:
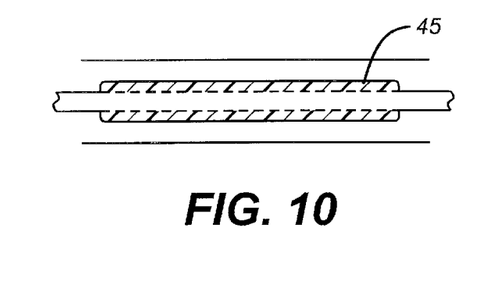
FIGS. 10 and 11 show expanding the assembly using an inflatable bladder.
Figure 11:
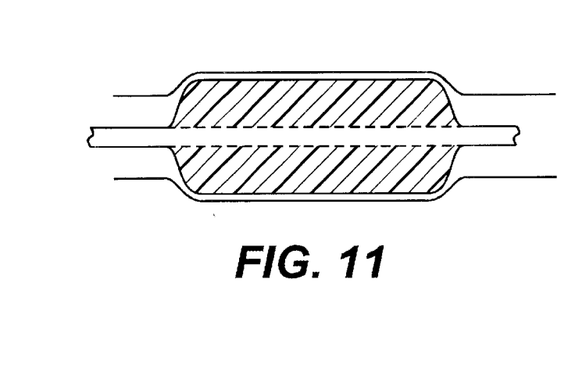

Another method of screen expansion would utilize hydraulic force by means of a bladder 45. The bladder 45 would be placed inside the screen and fluid inflated to a pressure that would expand the screen outward. Once the section of screen in which the bladder 45 was inflated had expanded the bladder could be deflated and moved to the next section of screen to be expanded. (See FIGS. 10 and 11). A variation of this method would be to have hydraulic actuated arms that would be extended to the ID of the screen and with sufficient force expand the screen. After expanding the screen the hydraulic pressure would be released, collapsing the arms and, the tool moved to a section of screen that needed expanding.

Figure 3:
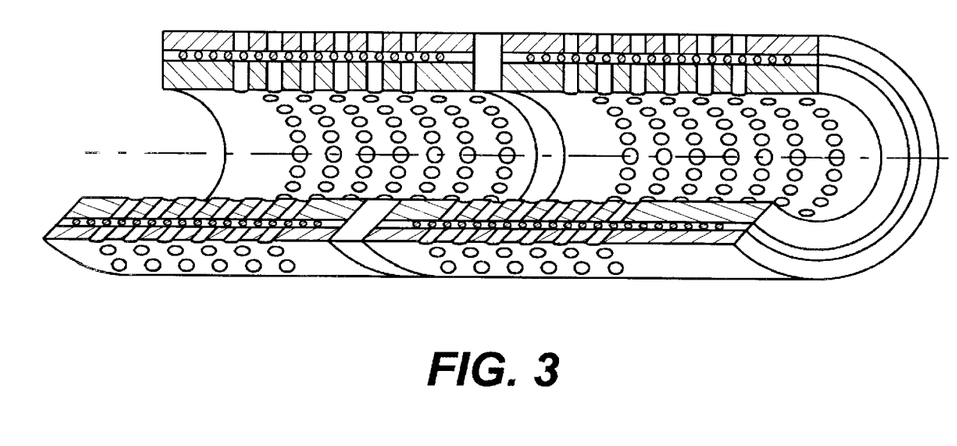
FIG. 3 is an alternative embodiment in section view made by running the inner and filter layers only through the sintering furnace.

An alternative to the technique shown in FIG. 1 involves just running layers 10 and 16 through the sintering furnace 14 and forming just those two layers into a tube by rolling them into a longitudinal joint or spirally rolling the sheet to make a spiral joint which can be welded to create the desired diameter in a tubular structure. The assembly of the layers 10 and 16 is then inserted into a pre-made tube of outer layer 20. When assembled as shown in FIG. 3, the look of the product is virtually identical to running all three layers through the furnace 14 as shown in FIGS. 1 and 2. Some clearance needs to be provided so that when rolled into a tube, layers 10 and 16 will slide readily into the outer layer 20 which has been preformed into a tube. Upon initiation of 20 expansion, the filter layer 16 very quickly contacts the outer layer 20 as the entire assembly is diametrically expanded in a manner known in the art. A wide choice of material is available for all of these layers. The open area of the inner and outer layers of 10 and 20 can be varied and the material of construction fo the outer layer which basically protects the filtering layer 16 can also be varied. The nature of the openings in the outer layer 20 can be perforations or punchouts which deflect the incoming flow in a manner well known in the art. The attachment of layers 10 and 16 in the furnace 14 also serves to increase the collapse resistance over prior designs. The technique shown in FIG. 1 where all three layers are attached to each other by going through the rollers 24 and 26 as well as the furnace 14 presents the design that has the greatest collapse resistance as between the two designs so far described.

Layers 10 and 20 can be perforated punched with louvers or any combination of the above techniques. The filteration layer can be any number of different materials such as woven metal which further includes Dutch weave, twill Dutch weave, square weave, and centered multi-layer metal weaves. The filtering layer 16 can also be made from PEEK woven material or from foamed metal.

As an alternative, the outer layer 20 and the filter layer can be sintered together in the furnace 14 and then mounted over the inner layer 10 which has been previously fashioned into a tube.

By adopting the construction designs as described above, the burst collapse and tensile strength of such an assembly is in some instances sufficient to alleviate the need for use of a base pipe. However, if additional strength is required a perforated base pipe can be inserted in the finished structure shown in FIG. 2 or 3 and the two structures welded together at the ends to further increase the structural of the final assembly.

When sintering layers 10 and 16 together and inserting them through a pre-made tube, the pre-made tube may be plastic such as PVC which has perforation. Alternatively, the outer layer 20 now made into a tube can be of the same material as the underlying layers. Regardless of how many layers are run through the furnace 14, a base pipe can be optionally inserted through the finished assembly which is welded or spiral wound into a tubular shape with end welds to further improve the strength of the completed structure.

Figure 5:
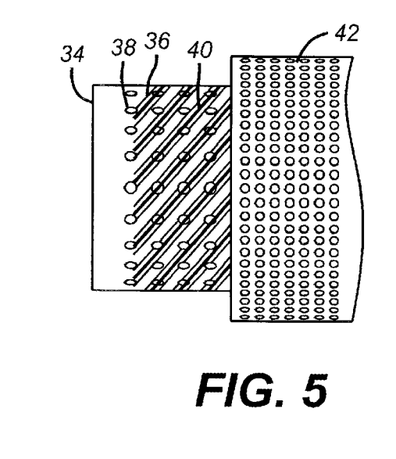
FIG. 5 is a cut-away view of an alternative embodiment showing a perforated based pipe with outer threads having a wire wound in the threads with an outer jacket cut back to facilitate viewing of the threads and wire.

Referring now to FIG. 5, a completely different approach is illustrated. A base pipe 34 is perforated to have a bout 30 to 40% open area. Its outer surface comprises a thread 36 which is interrupted by the perforations 38 which extend from the inside of the base pipe 34 to its outer surface where the thread 36 is machined on to it. Wound inside the thread is a wire 40 which is attached to the base pipe 34 at either and optionally, at intermediate locations. The opening size for filtration is a factor of the thread pitch and the wire diameter wound inside between the thread peaks. The opening shape can be as previously described. The entire assembly can be surrounded with an outer shroud 42 which can be perforated, punched, or made in any other way so as to have preferably 20 to 40% open area. The advantage to this design is its structural strength as well as the reliability of the dimensions of the openings for filtration. Diametric expansion in the order of 25±10% is possible with very minor, if any, deviation in the opening size. The reason this occurs is that as diametric expansion is occurring, the diameter of the wrapped wire inside the thread is decreasing. However, diametric expansion of the base tube 34 reduces its longitudinal length and brings the thread pitches together. The bringing together of the thread pitches compensates for the decrease in diameter of the wire which is extending in the thread between its peaks. The net result is that the opening size for filtration purposes remains relatively constant. The advantages in increased strength to resist collapse are apparent. Additionally, the reliability of the structure after dramatic expansions diametrically is also a significant advantage of this design technique.

Figure 6:
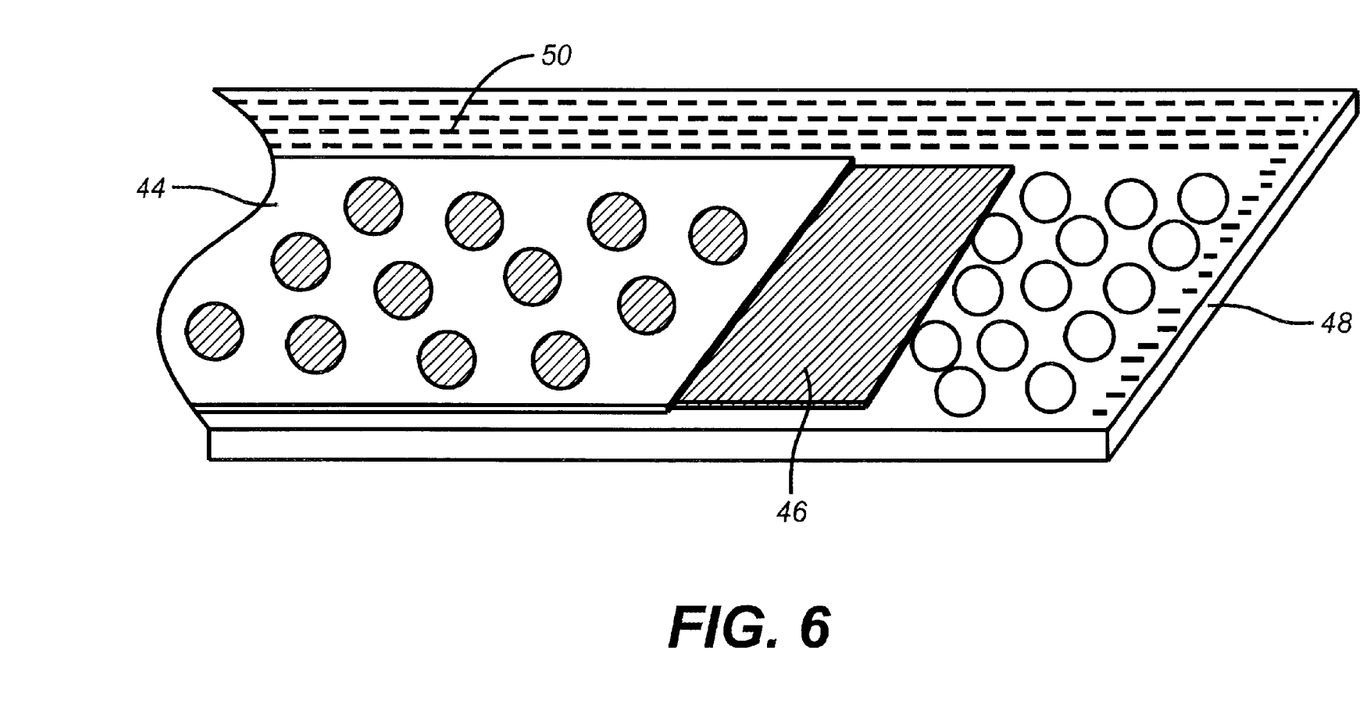
FIG. 6 is a view of an alternative embodiment to FIGS. 1 and 2 using end openings and a partial filtration membrane.
Figures 12, 13:
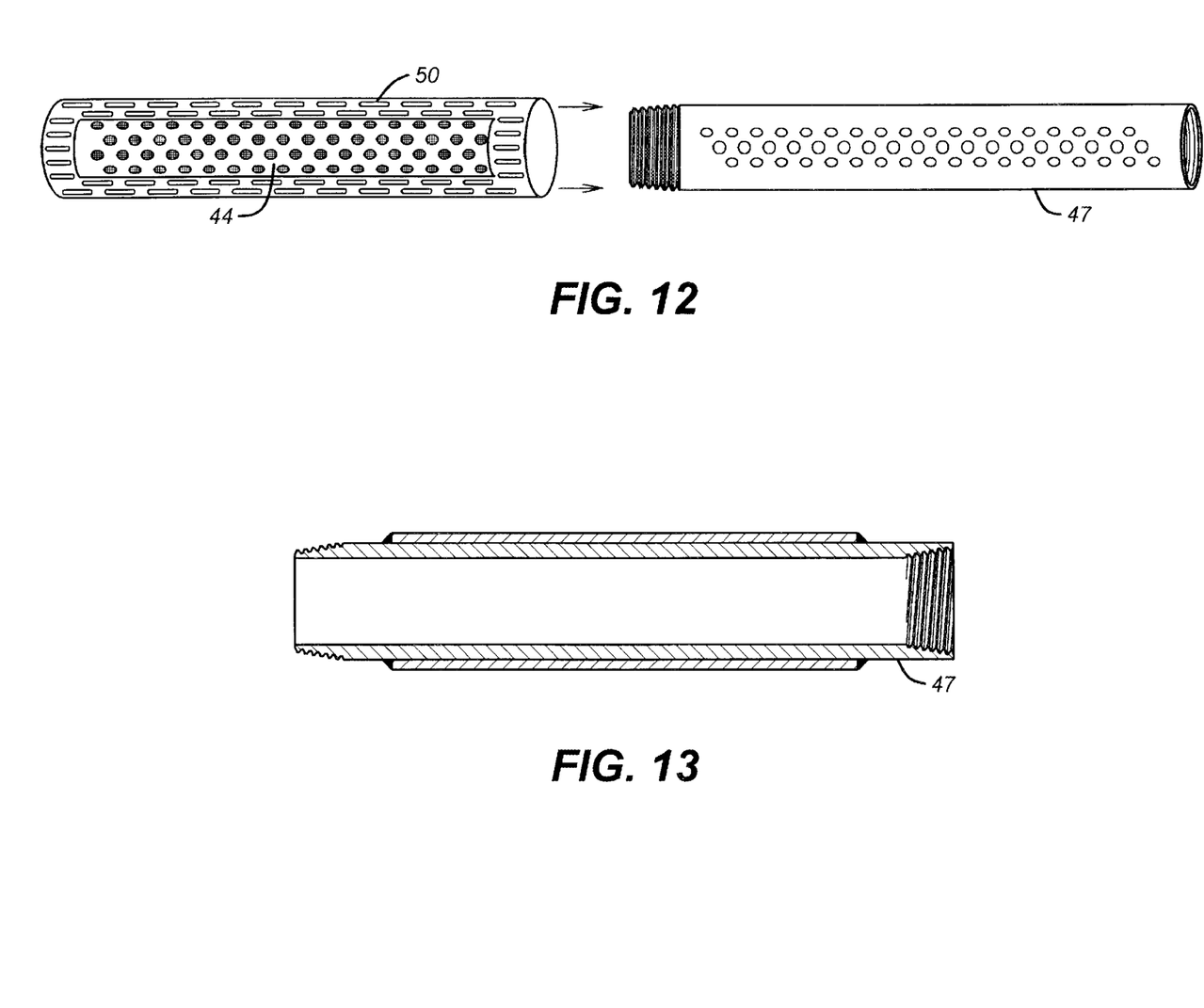
FIG. 12 shows placement of a tube made of half sections of the sheet shown in FIG. 6 over a thin wall pipe.
FIG. 13 is the view of FIG. 12 after expansion.

Another alternative design is shown in FIG. 6. This design incorporates 3 layers similar to the previous designs however the top layer covers the filtration media completely but only partially covers the bottom layer 48. Likewise, the filtration layer 46 would only partially cover the bottom layer 48. Both the top 44 and bottom 48 layers are constructed of fully annealed 316L stainless steel or a material of similar properties which is perforated with holes or openings, as previously described 50 to yield 10–30% open area. The three layers are sintered together to form a ridged plate (See FIG. 6) which would be formed into a half tube. The two half tubes of the sintered layers would be welded together to form an expandable screen cartridge tube. This tube would then be placed over a tube 47 that has been perforated or has openings of the shapes previously described only under the filtration media. (See FIG. 12). When expanding the complete screen assembly the holes 50 in the bottom layer of the filtration cartridge would bend open between the sections of the multiple layers. This phenomenon is akin to expanding a stent in blood vessel. This requires much less force than yielding the combination of the outer layer, filtration layer and the bottom layer. By only bending the area between the filtration media a small amount of force is needed to expand the screen and the opening size of the filtration media is not affected. (See FIG. 13).

Accordingly, the various embodiments have described techniques for constructing screens which can be expanded as much as about 35% diametrically while still providing high collapse resistance and reliability of the filter medium.

One method that can be incorporated into the production of metal screen that is expandable is to anneal the screen product which may or may not include a base pipe, or use individual annealed products to create a more ductile product able to yield and expand before reaching its ultimate tensile strength and parting.

Annealing is a common metal process that uses heating process to reduce a metal's hardness and increase its ductility.

Those skilled in the art will appreciate that modifications of the above-described preferred embodiments can be made without departing from the spirit of the invention whose scope is defined in the claims which appear below.

We claim:

1. A method of manufacturing a filter which can be expanded downhole, comprising:

attaching a filter layer to a second layer having openings to form a sheet;

forming a first tube from said sheet having a seam;

sealing said seam.

2. The method of claim 1, further comprising:

fitting said first tube inside a second tube with openings;

attaching said tubes together.

3. The method of claim 1, further comprising:

fitting said first tube outside a second tube with openings;

attaching said tubes together.

4. The method of claim 1, further comprising:

attaching a third layer having openings on the opposite side of said filter layer from said second layer to form a three layer sheet;

forming said first tube from said three layer sheet to have at least one seam;

sealing said seam.

5. The method of claim 4, further comprising:

mechanically compressing said layers together.

6. The method of claim 1, further comprising mechanically compressing said layers together.

7. A method of manufacturing a filter which can be expanded downhole, comprising:

attaching a filter layer to a second layer having openings to form a sheet;

forming a first tube from said sheet having at least one seam;

sealing said seam; and sintering said layers together.

8. The method of claim 7, further comprising:

mechanically compressing said layers together.

9. A method of manufacturing a filter which can be expanded downhole, comprising:

attaching a filter layer to a second layer having openings to form a sheet;

forming a first tube from said sheet having at least one seam;

sealing said seam;

attaching a third layer having openings on the opposite side of said filter layer from said second layer to form a three layer sheet;

forming said first tube from said three layer sheet to have at least one seam;

sealing said seam; and sintering said layers together.

10. The method of claim 9, further comprising:

mechanically compressing said layers together.

11. A method of manufacturing a filter which can be expanded downhole, comprising:

attaching a filter layer to a second layer having openings to form a sheet;

forming a first tube from said sheet having at least one seam;

sealing said seam;

attaching a third layer having openings on the opposite side of said filter layer from said second layer to form a three layer sheet;

forming said first tube from said three layer sheet to have at least one seam;

sealing said seam; and providing a zone of no overlap of said filter layer on one of said second and third layers;

configuring said zone so as to decrease its resistance to expansion.

12. The method of claim 11, further comprising:
inserting said first tube over a second tube with openings;
providing no openings in said second tube portion which aligns with said zone of no overlap;
joining said tubes.

13. The method of claim 11, further comprising:
providing a plurality of openings on said zone which are smaller than openings on the same layer outside said zone.

14. A method of manufacturing a filter which can be expanded downhole, comprising:
attaching a filter layer to a second layer having openings to form a sheet;
forming a first tube from said sheet having at least one seam;
sealing said seam; and
providing a zone of no overlap between said filter layer and said second layer;
configuring said zone to decrease its resistance to expansion.

15. The method of claim 14, further comprising:
inserting said first tube into a second tube with openings;
providing no openings in said second tube portion which aligns with said tube zone of no overlap;
joining said tubes.

16. The method of claim 14, further comprising:
providing a plurality of openings on said zone which are smaller than openings on the same layer outside said zone.

17. A method of forming a downhole filter comprising:
providing a tubular with openings;
providing at least one surface groove on said tubular which intersects said openings;
mounting at least one elongated member in said groove.

18. The method of claim 17, further comprising:
providing a thread on the outside of said tubular as said groove.

19. The method of claim 17, further comprising:
creating a consistent open hole size for fluid flow around said elongated member and through said openings;
substantially retaining said open hole size despite diametric expansion of at least 25%.

20. A method of manufacturing a filter which can be expanded downhole, comprising:
attaching a filter layer to a second layer having openings to form a sheet;
forming a first tube from said sheet having at least one seam;
sealing said seam; and
substantially retaining the opening size in said filter layer despite diametric expansion of said first tube of greater than 25%.

21. A method of manufacturing a filter which can be expanded downhole, comprising:
attaching a filter layer to a second layer having openings to form a sheet;
forming a first tube from said sheet having at least one seam;
sealing said seam; and
minimizing relative movement of said layers when said tube is diametrically expanded by said attachment.

22. A method of manufacturing a filter which can be expanded downhole, comprising:
attaching a filter layer to a second layer having openings to form a sheet;
forming a first tube from said sheet having at least one seam;
sealing said seam;
attaching a third layer having openings on the opposite side of said filter layer from said second layer to form a three layer sheet;
forming said first tube from said three layer sheet to have at least one seam;
sealing said seam; and
substantially retaining the opening size in said filter layer despite diametric expansion of said first tube of greater than 25%.

23. A method of manufacturing a filter which can be expanded downhole, comprising:
attaching a filter layer to a second layer having openings to form a sheet;
forming a first tube from said sheet having at least one seam;
sealing said seam;
attaching a third layer having openings on the opposite side of said filter layer from said second layer to form a three layer sheet;
forming said first tube from said three layer sheet to have at least one seam;
sealing said seam; and
minimizing relative movement of said layers when said tube is diametrically expanded by said attachment.

24. A method of manufacturing a filter which can be expanded downhole, comprising:
attaching a filter layer to a second layer having openings to form a sheet;
forming a first tube from said sheet having at least one seam;
sealing said seam; and
annealing said layers before or after forming said sheet.

25. A method of manufacturing a filter which can be expanded downhole, comprising:
attaching a filter layer to a second layer having openings to form a sheet;
forming a first tube from said sheet having at least one seam;
sealing said seam;
attaching a third layer having openings on the opposite side of said filter layer from said second layer to form a three layer sheet;
forming said first tube from said three layer sheet to have at least one seam;
sealing said seam; and
annealing said layers before or after forming said sheet.

* * * * *